(12) United States Patent
Acharya et al.

(10) Patent No.: US 10,255,103 B2
(45) Date of Patent: Apr. 9, 2019

(54) TRANSACTION HANDLING

(71) Applicant: ARM Limited, Cambridge (GB)

(72) Inventors: Chiranjeev Acharya, Sheffield (GB); Arthur Brian Laughton, Hathersage (GB); Sean James Salisbury, Appley Bridge (GB)

(73) Assignee: ARM Limited, Cambridge (GB)

( * ) Notice: Subject to any disclaimer, the term of this patent is extended or adjusted under 35 U.S.C. 154(b) by 56 days.

(21) Appl. No.: 15/478,443

(22) Filed: Apr. 4, 2017

(65) Prior Publication Data
US 2018/0285145 A1    Oct. 4, 2018

(51) Int. Cl.
| | |
|---|---|
| *G06F 9/46* | (2006.01) |
| *G06F 13/364* | (2006.01) |
| *G06F 13/16* | (2006.01) |
| *G06F 13/42* | (2006.01) |
| *G06F 5/14* | (2006.01) |

(52) U.S. Cl.
CPC .......... *G06F 9/467* (2013.01); *G06F 13/1673* (2013.01); *G06F 13/364* (2013.01); *G06F 13/4282* (2013.01); *G06F 5/14* (2013.01); *G06F 2205/126* (2013.01)

(58) Field of Classification Search
None
See application file for complete search history.

(56) References Cited

U.S. PATENT DOCUMENTS

| | | | | |
|---|---|---|---|---|
| 6,240,479 | B1* | 5/2001 | Snyder | G06F 13/364 710/113 |
| 7,877,511 | B1* | 1/2011 | Berger | G06F 17/30067 709/201 |
| 2004/0123040 | A1* | 6/2004 | Jung | G06F 12/0804 711/135 |
| 2014/0281270 | A1* | 9/2014 | Neefs | G06F 12/0813 711/143 |
| 2015/0039558 | A1* | 2/2015 | Yamada | G06F 17/30289 707/623 |
| 2016/0147861 | A1* | 5/2016 | Schreter | G06F 17/30353 707/607 |
| 2016/0267406 | A1* | 9/2016 | Bodo | G06Q 10/0635 |
| 2017/0286297 | A1* | 10/2017 | Voigt | G06F 12/08 |

* cited by examiner

*Primary Examiner* — Henry Tsai
*Assistant Examiner* — Aurangzeb Hassan
(74) *Attorney, Agent, or Firm* — Nixon & Vanderhye P.C.

(57) ABSTRACT

Transaction handling apparatus comprises a response buffer; and tracking circuitry to store data defining each transaction issued by one or more transaction master devices and to control routing of a transaction response to a given transaction either to the response buffer or as an output to the transaction master device which issued the given transaction; the response buffer being configured to access an indicator for each buffered transaction response indicating whether a response has been output by the apparatus for a previously issued transaction, on which that buffered transaction response depends, and to output the buffered transaction response to the transaction master device which issued that transaction when the previously issued transaction has already been output by the apparatus.

13 Claims, 6 Drawing Sheets

TRANSACTION HANDLING

BACKGROUND

This disclosure relates to transaction handling.

In an arrangement of master devices issuing transactions (such as data access transactions, for example data read or write transactions) to slave devices via an interconnect, the transaction responses can in principle be received back in any order.

In some examples, transactions need to be processed by the transaction-initiating master device in the order in which the transactions were issued. In other examples, such as in so-called AMBA (Advanced Microcontroller Bus Architecture) protocols, transactions having the same transaction identifier need to be handled in this way (that is to say, returned in the order of issue) but transactions having different identifiers can be returned in any order.

Some slave devices (which service or fulfil transactions) can maintain ordering in their responses. However an issue can arise when a set of transactions having the same identifier, and so having the requirement of their responses being returned in transaction issue order, are routed to multiple slave devices. The use of more than one slave device means that measures are needed to avoid a set of transactions having the same identifier being returned in a wrong order.

SUMMARY

In an example arrangement there is provided transaction handling apparatus comprising:
a response buffer; and
tracking circuitry to store data defining each transaction issued by one or more transaction master devices and to control routing of a transaction response to a given transaction either to the response buffer or as an output to the transaction master device which issued the given transaction;
the response buffer being configured to access an indicator for each buffered transaction response indicating whether a response has been output by the apparatus for a previously issued transaction, on which that buffered transaction response depends, and to output the buffered transaction response to the transaction master device which issued that transaction when the previously issued transaction has already been output by the apparatus.

In another example arrangement there is provided a transaction handling method comprising:
storing data defining each transaction issued by one or more transaction master devices;
controlling routing of a transaction response to a given transaction either to a response buffer operable to buffer the transaction response or as an output to the transaction master device which issued the given transaction;
accessing data for each buffered transaction response indicating a previously issued transaction on which that buffered transaction response depends; and
outputting the buffered transaction response to the transaction master device which issued that transaction when the previously issued transaction has already been output by the apparatus.

In another example arrangement there is provided transaction handling apparatus comprising:
means for buffering transaction responses;
means for storing data defining each transaction issued by one or more transaction master means;
means for controlling routing of a transaction response to a given transaction either to a means for buffering or as an output to the transaction master means which issued the given transaction;
means for accessing data for each buffered transaction response indicating whether a response has been output by the apparatus for a previously issued transaction on which that buffered transaction response depends; and
means for outputting the buffered transaction response to the transaction master means which issued that transaction when the previously issued transaction has already been output by the apparatus.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
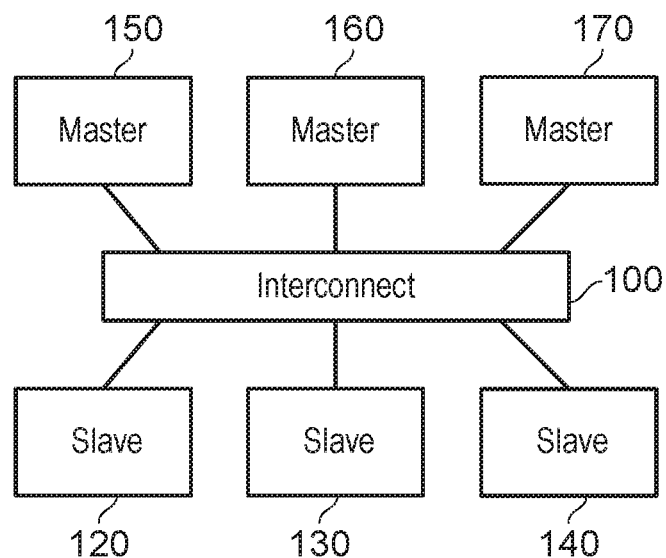
FIG. 1 schematically illustrates a data processing apparatus.

Before discussing the embodiments with reference to the accompanying figures, the following description of embodiments is provided.

An example embodiment provides transaction handling apparatus comprising:
a response buffer; and
tracking circuitry to store data defining each transaction issued by one or more transaction master devices and to control routing of a transaction response to a given transaction either to the response buffer or as an output to the transaction master device which issued the given transaction;
the response buffer being configured to access an indicator for each buffered transaction response indicating whether a response has been output by the apparatus for a previously issued transaction, on which that buffered transaction response depends, and to output the buffered transaction response to the transaction master device which issued that transaction when the previously issued transaction has already been output by the apparatus.

Example embodiments can provide a technique for handling the ordering of transaction responses which may be returned to the transaction handling apparatus in an arbitrary relative order but which need to be output in order of issue. By the structure defined here, potentially the use of storage and/or the operation of the transaction handling apparatus can be made more efficient.

Some potential advantages of at least example embodiments can include:
(a) Potentially independent control of the sizing of the different buffers (the tracking circuitry, the response buffer and the storage of the indicators. This can mean that in a system with (typically) a large proportion of transactions having unique IDs (being unrelated transactions from the point of view of potentially needing reordering), a smaller (expensive, in terms of circuitry space) response buffer can be used, while keeping the (potentially cheaper) tracking circuitry larger to handle a large number of outstanding requests. Similarly a high proportion of transactions consist of multiple beats then the size of storage for the indicators can be smaller than that of the response buffer.

(b) Transactions which don't have any dependency on previously issued transactions, do not have to use the response buffer so in example arrangements they will not be stalled even if the response buffer is full. This can provide higher performance and lower power consumption.

(c) The separation of tracking mechanisms also allows trackers to be distributed (instead of being one large central tracker) easing the physical implementation thus potentially achieving higher frequency of operation.

(d) The separation of tracking mechanisms allows each tracking mechanism to look up or obtain the relevant data from the other tracking mechanism, but also allows one tracking mechanism to pre-populate another with relevant data so that (for example) when a transaction response is received, rather than a complete new lookup operation, the required data is already in place. This can allow localised operation of individual tracking mechanisms which can potentially provide faster operation and/or lower power consumption.

In some examples, the tracking circuitry comprises:

mapping circuitry to map each transaction to a transaction index; and a transaction index memory to store, for a given transaction, data defining the transaction index of a previous transaction on which the given transaction is dependent.

In example arrangements the response buffer and the transaction index memory cooperate to store an indicator to indicate whether, for the given transaction, the response to the previous transaction has been output; and the response buffer is configured to buffer a transaction response received in respect of the given transaction at least until the indicator indicates that a response to the previous transaction has been output.

For example, in which the mapping circuitry can be configured to provide the data, defining the transaction index of a previous transaction, to the transaction index memory in response to issue of the given transaction. This can enable the advantage (d) discussed above and avoid the need for time-consuming and/or power-consuming lookup operations at the time that a transaction response is received.

In example arrangements the mapping circuitry and the transaction index memory are configured to detect whether a transaction has a dependency on a previous transaction and to store data defining the transaction index of a previous transaction in the transaction index memory only when the transaction is dependent on a previous transaction. To facilitate the location of a transaction response which is now deemed ready for output (for example in response to a transaction response being output for a previous transaction on which it depends) in some examples the transaction index memory is configured to store, for the given transaction, a buffer location in the response buffer for buffering a response to the given transaction. In some examples, the need for buffering can be avoided altogether for a transaction response for which it has no relevance, by the mapping circuitry being configured to generate (and, in some examples, store) a bypass indication in respect of a transaction which is independent of any previous transaction; and the apparatus being configured to output a response for a transaction having a bypass indication generated by the mapping circuitry.

In some examples, each transaction has an associated transaction identifier and an associated destination identifier; and a transaction is detected to be dependent upon a previous transaction when the previous transaction has the same transaction identifier but a different destination identifier, and a response has not yet been output for the previous transaction. In this way, transactions which are routed to the same slave or destination device may be deemed to be serviced in the correct order by the slave device, but transactions routed to different destinations but having the same identifier are handled as interdependent using the present techniques.

At output of a transaction, embodiments of the disclosure use output circuitry to output a given transaction response and to initiate the setting of the indicator to indicate, for a transaction dependent upon the given transaction response, that the given transaction response has been output. In some examples, the transaction index memory is addressable by a transaction index of transaction response output by the apparatus to provide the transaction index of a transaction dependent upon the transaction response output by the apparatus. The response buffer may be configured to store the indicator to indicate whether, for the given transaction, the response to the previous transaction has been delivered.

Similar arrangements can be used for transaction responses received as multiple successive response portions, the response buffer is configured to buffer the response portions at least until a last of the response portions has been received. If the response having multiple response portions is independent of any other response, it can then be output. or, in example embodiments, the response buffer is configured to output the buffered transaction response to the transaction master device which issued that transaction when a last of the response portions has been received and the previously issued transaction has already been output by the apparatus Another example embodiment provides a transaction handling method comprising:

storing data defining each transaction issued by one or more transaction master devices;

controlling routing of a transaction response to a given transaction either to a response buffer operable to buffer the transaction response or as an output to the transaction master device which issued the given transaction;

accessing data for each buffered transaction response indicating a previously issued transaction on which that buffered transaction response depends; and outputting the buffered transaction response to the transaction master device which issued that transaction when the previously issued transaction has already been output by the apparatus.

Another example embodiment provides transaction handling apparatus comprising:

means for buffering transaction responses;

means for storing data defining each transaction issued by one or more transaction master means;

means for controlling routing of a transaction response to a given transaction either to a means for buffering or as an output to the transaction master means which issued the given transaction;

means for accessing data for each buffered transaction response indicating whether a response has been output by the apparatus for a previously issued transaction on which that buffered transaction response depends; and means for outputting the buffered transaction response to the transaction master means which issued that transaction when the previously issued transaction has already been output by the apparatus.

Referring now to the drawings, FIG. 1 schematically illustrates a data processing apparatus embodied as a network of devices interconnected by an interconnect 100. The apparatus may be provided as a single integrated circuit such as a so-called system on chip (SoC) or network on chip (NoC) or as a plurality of interconnected discrete devices.

Various so-called nodes are connected via the network 100. These include one or more slave nodes (SN) such as a higher level cache memory 120 (the reference to "higher level" being with respect to a cache memory provided by a requesting node), a main memory 130 and a peripheral device 140. The apparatus may provide for communication amongst the nodes by an AMBA protocol for example.

FIG. 1 also shows a plurality of so-called master or "requesting" nodes (RN) 150, 160, 170, which are configured to issue data access transactions to access (for example, read or write) data from or to the slave devices.

Figure 2:
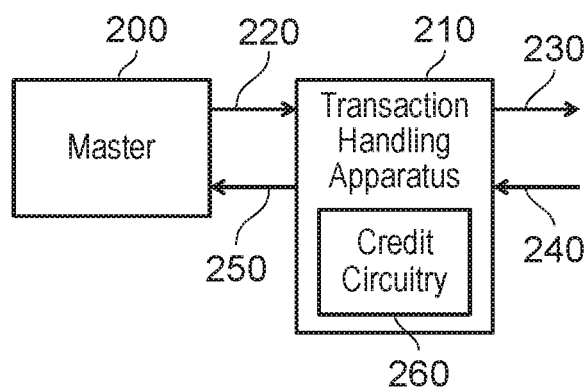
FIG. 2 schematically illustrates a master node and a transaction handling apparatus.

FIG. 2 schematically illustrates a master device 200 such as one of the masters 150, 160, 170 of FIG. 1, and associated transaction handling apparatus 210. In FIG. 2, the transaction handling apparatus 210 is shown separate from the master 200, but in other examples the transaction handling apparatus could be incorporated as part of the input/output functionality of the master 200. In other examples the transaction handling apparatus could be part of the functionality of the interconnect 100 or of another intermediate node. In general terms, the transaction handling apparatus could be at any topographic position in the network which is upstream of a point at which transactions may be routed to plural potential target or slave devices.

The master device 200 issues data handling transactions on an output 220. The transaction handling apparatus 210 stores information to enable it to track those transactions before they are forwarded to one or more slave devices on an output 230. Responses from the slave devices are received as an input 240 and are either passed directly to the master device 200 at an output 250 or are buffered, for example to allow the responses to be reordered by the transaction handling apparatus in a manner to be discussed below.

The transaction handling apparatus also includes optional credit circuitry 260. The credit circuitry 260 provides so-called credits to allow transactions to be issued at the output 230, such that (for example) the number of outstanding transactions, which is to say transactions which have been issued at the output 230 but for which a response has not yet returned to the input 240, is limited to no more than a number of available credits. So, when a transaction is issued at the output 230 the number of available credits is decreased, for example by one. When a transaction response is returned at the input 240, the number of credits is increased by the credit circuitry 260, for example by one. The number of credits is initialised to a particular quantity at system start up or reboot, for example on the basis of system configuration information. If the number of credits under the control of the credit circuitry 260 reaches zero, further transactions are stalled and are inhibited from being issued at the output 230 until a credit is made available.

The credit checking mechanism will be discussed further below in connection with FIG. 5. A transaction can be blocked because the response buffer (320—see below) is full only if it requires reordering. As discussed below in connection with FIG. 5, if a transaction has a unique ID then it will not be blocked (and indeed, at least this aspect of the credit check mechanism will not take place in some example arrangements).

If the packet tracker (300—see below) is currently full, all outgoing transactions are blocked until it is no longer full (by virtue of an outstanding transaction response having been received and a packet tracker entry having been released).

So in some example arrangements there can be multiple credits and credit checks:
 (a) credits reflecting the current number of available packet tracker entries—this check applies to all transactions and a transaction is blocked if there are none of these credits available;
 (b) credits reflecting the number of available response buffer entries—as discussed below this credit check applies only to transactions which need (or may need) reordering (which have same id as previously issued transaction for which response has not yet been issued)

Figure 3:
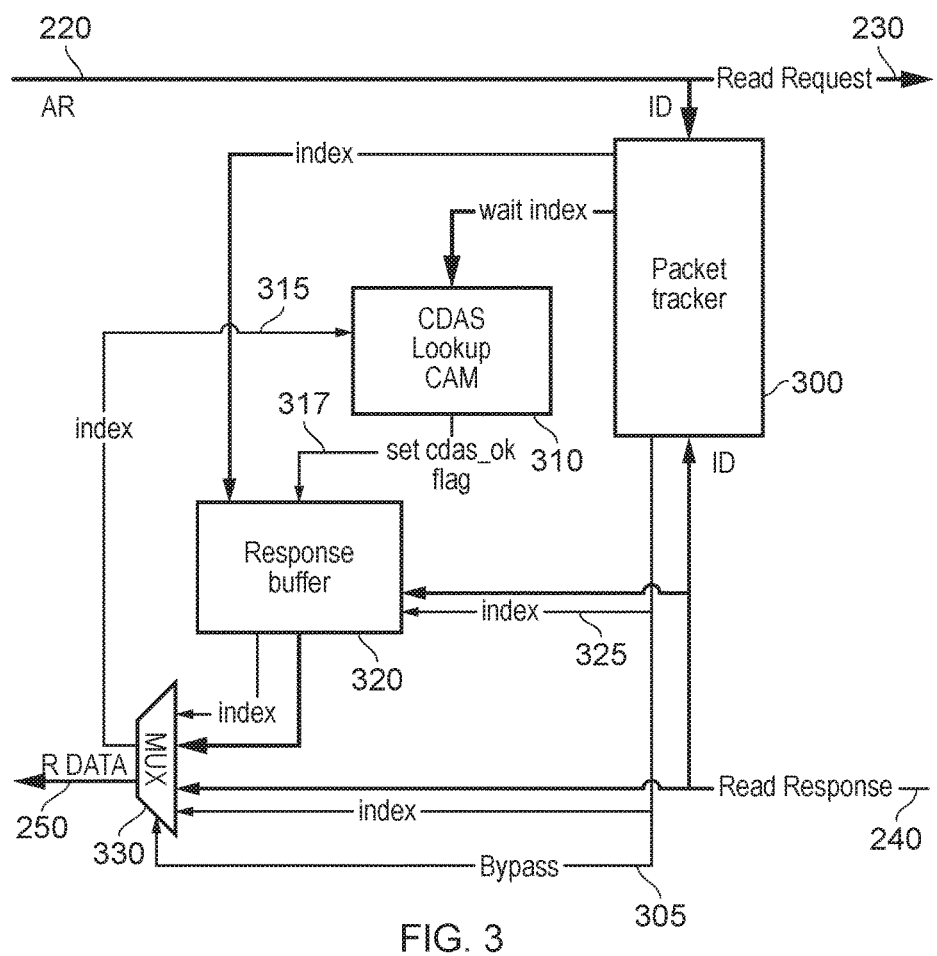
FIG. 3 schematically illustrates a transaction handling apparatus.

FIG. 3 schematically illustrates the transaction handling apparatus in more detail. FIG. 3 shows a packet tracker 300, a CDAS memory 310 (where "CDAS" stands for "Cyclic Dependency Avoidance Scheme" in this context), a response buffer 320 and a multiplexer 330. The functionality of the credit circuitry is not shown in FIG. 3 for clarity of the diagram. The annotations in FIG. 3 relate to data read requests and read responses by way of example.

Before describing the operation in FIG. 3, the nature of a transaction will first be discussed, in that transactions issued by the master device 200 of FIG. 2 have associated transaction identifiers. In some situations, a transaction identifier might apply to only one transaction. Or, a transaction identifier may be common to a group of two or more transactions. In the present examples, if a transaction identifier is common to a group of two or more transactions, those transactions have to be completed (which is to say, their response returned to the issuing master) in the order of their issue.

In these arrangements, transaction identifiers may be reused, so the reference to the application to only one transaction refers to only one currently "live" transaction at a time. Once the transaction has been completed, the transaction identifier can be retired and then reused in a future transaction without overlap with the first transaction.

If the transactions in such a group (having a common transaction identifier) are all serviced or fulfilled by the same slave device, it can be assumed that the slave device will respect the ordering of the transactions and will return the responses in the appropriate order.

However, if the transactions in such a group are routed to two or more slave devices (for example, because of multiplexing or striping of data storage, and/or because the transactions refer to data storage addresses which span multiple slave devices) then there can be an ordering issue regarding the responses to those transactions. In particular, each of the two or more slave devices does not have awareness or control over the timing of responses by any of the other ones of the two or more slave devices. So, the transaction handling apparatus 210 tracks the transactions in such a group and, where appropriate, buffers them (in the response buffer 320) so that they can be returned to the master device on the output 250 in the correct order.

FIG. 3 therefore provides an example of transaction handling apparatus comprising:
 a response buffer 320; and
 tracking circuitry 300 to store data defining each transaction issued by one or more transaction master devices and to control routing of a transaction response to a given transaction (for example, in response to data such as a bypass flag generated and stored at the stage of issuing the transaction) either to the response buffer or as an output to the transaction master device which issued the given transaction;

the response buffer being configured to access an indicator (such as CDAS_ok) for each buffered transaction response indicating whether a response has been output by the apparatus for a previously issued transaction, on which that buffered transaction response depends, and to output the buffered transaction response to the transaction master device which issued that transaction when the previously issued transaction has already been output by the apparatus. In the present example the response buffer is configured to store the indicator (CDAS_ok) to indicate whether, for the given transaction, the response to the previous transaction has been output.

The example tracking circuitry of FIG. 3 illustrates mapping circuitry 300 to map each transaction to a transaction index; and a transaction index memory 310 to store, for a given transaction, data defining the transaction index of a previous transaction on which the given transaction is dependent.

Figure 4:
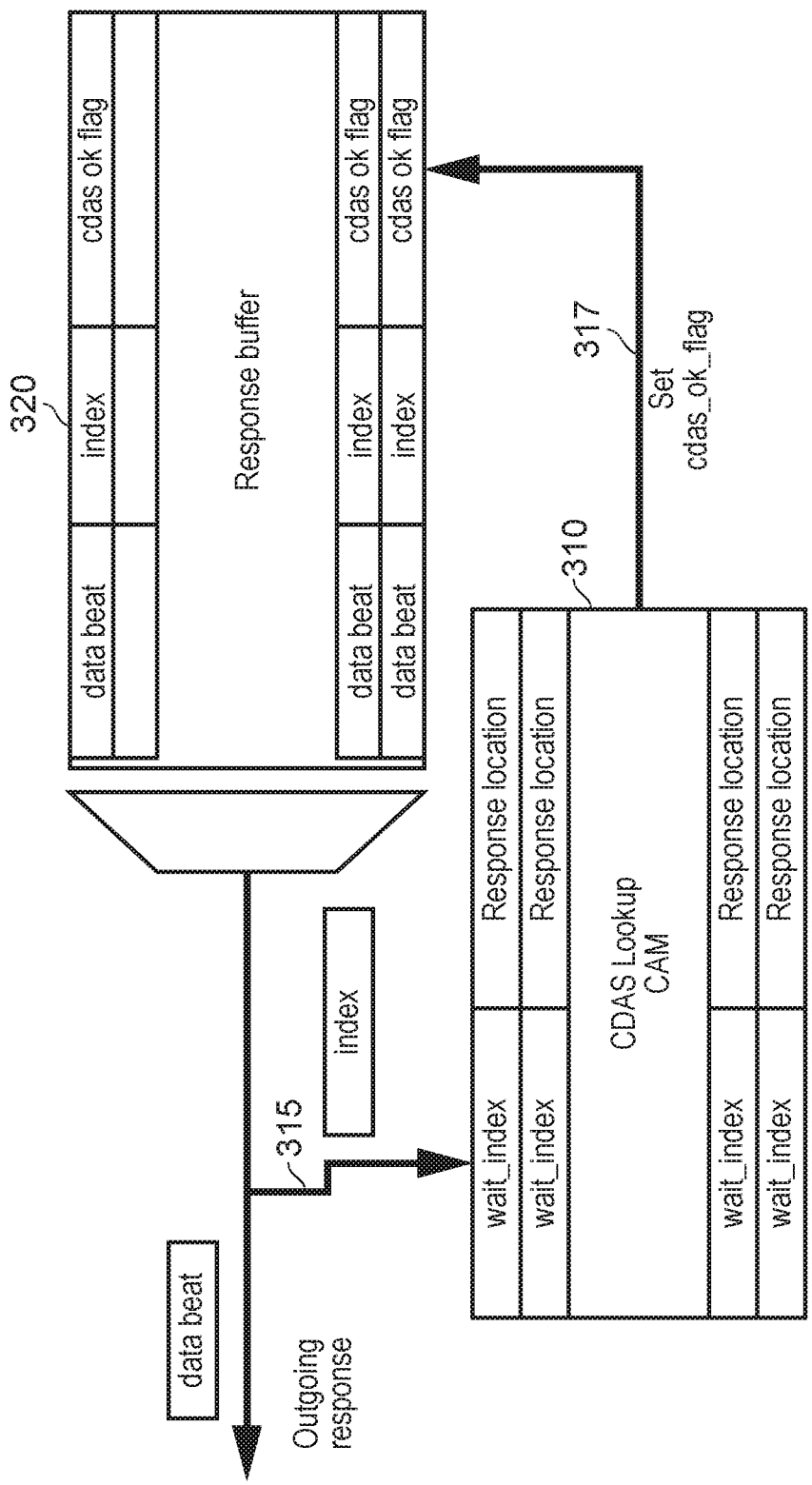
FIG. 4 schematically illustrates stored data in the apparatus of FIG. 3.

The operation of the transaction handling apparatus of FIG. 3 will be discussed in more detail with reference to FIGS. 4 to 6. FIG. 4 provides a more detailed representation of data stored in the response buffer and they CDAS memory 310, FIG. 5 is a schematic flowchart illustrating a method relating to the issue of a read request, and FIG. 6 is a schematic flowchart relating to the receipt of a read response by the transaction handling apparatus.

Considering first the issue of a read request, the request is received from the master device 200 on the input 220.

Figure 5:
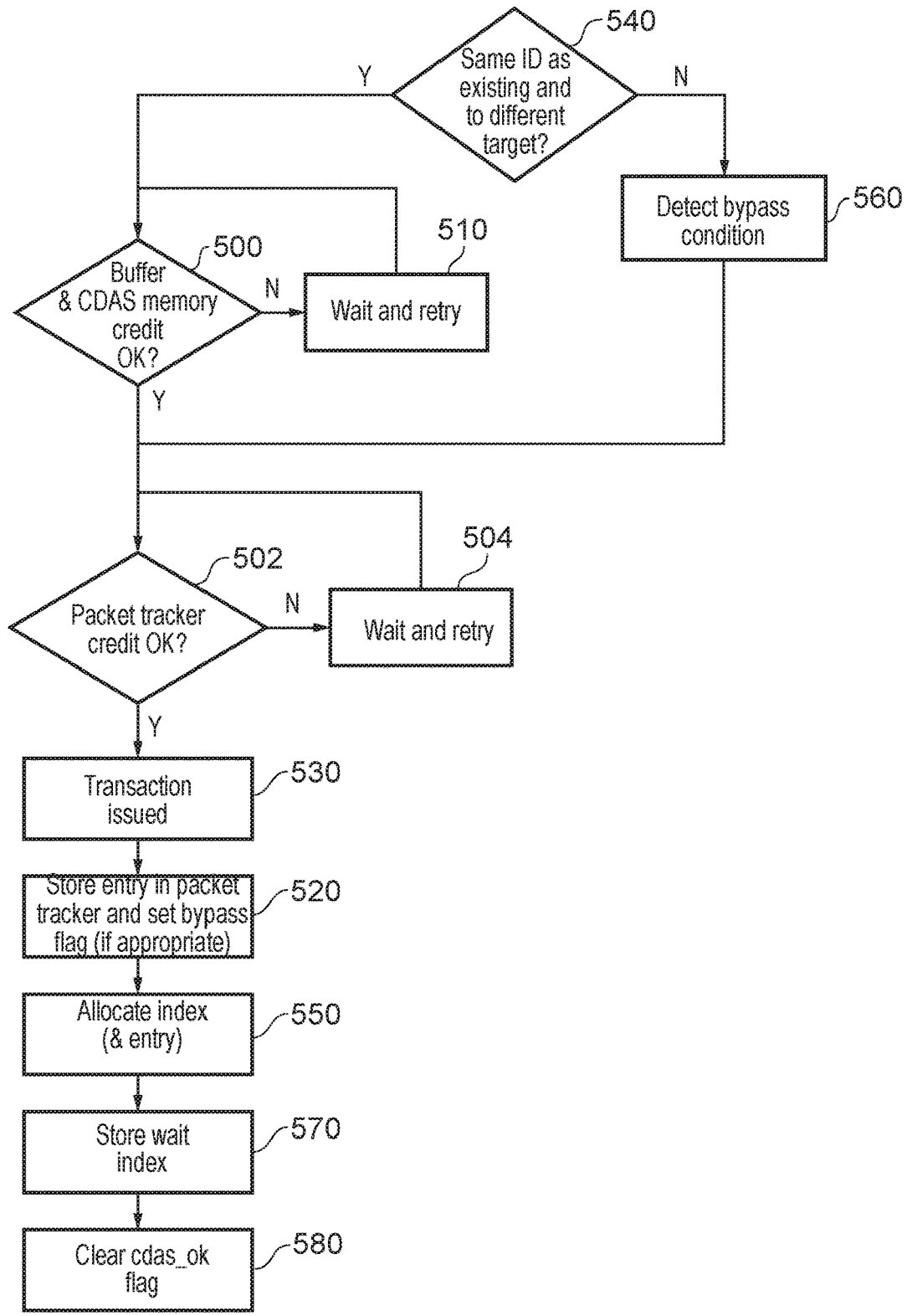
FIGS. 5 to 7 are schematic flowcharts illustrating respective methods.
Figure 6:
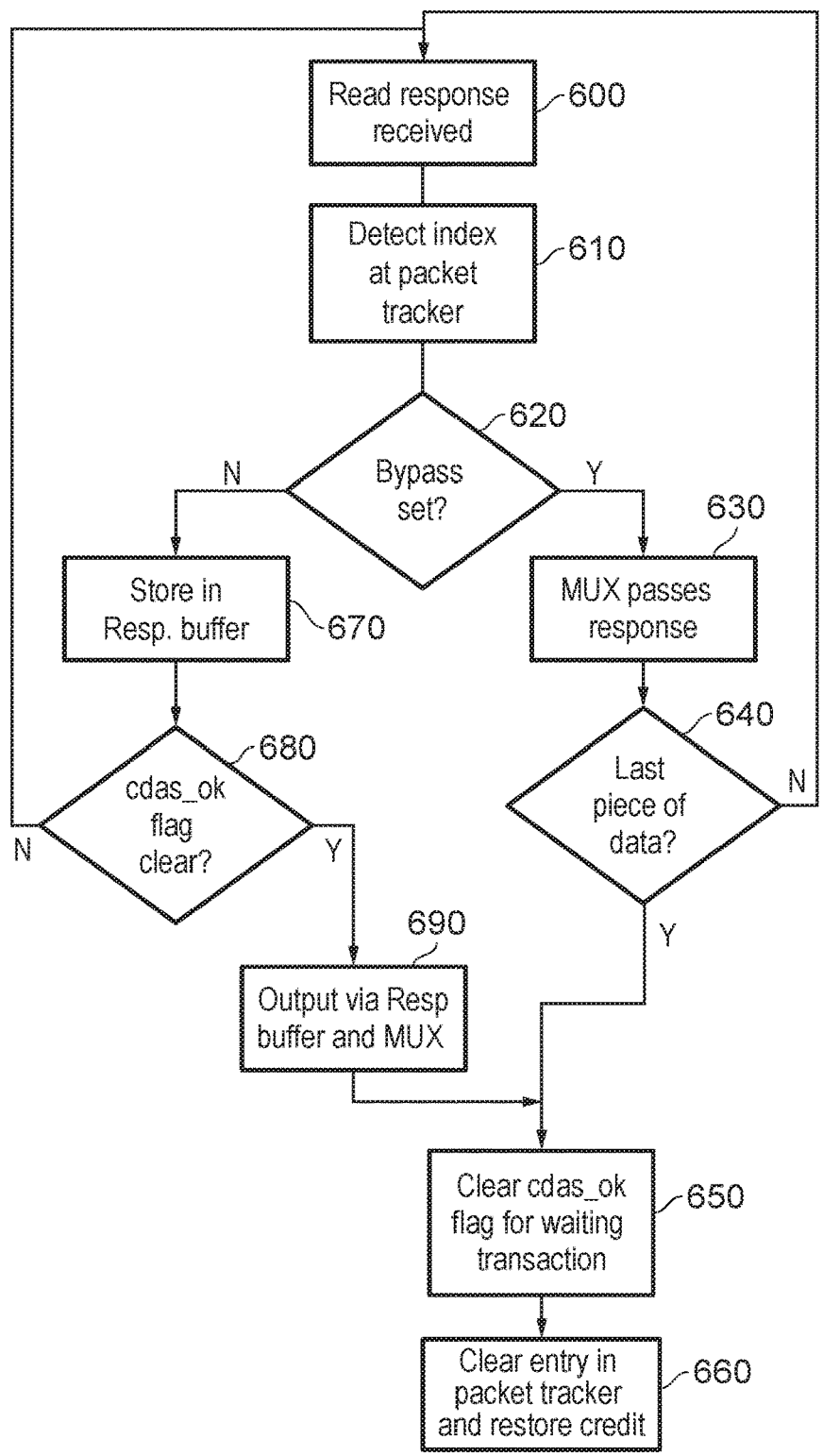

Referring to FIG. 5, a first check is carried out by the packet tracker 300 at a step 540 to detect whether the transaction's response can be safely returned immediately on receipt, which is to say that no currently outstanding transaction has the same identifier but a different destination or target. Therefore, this test can detect whether any of the following apply: (a) the transaction may be part of a group sharing a transaction identifier but it is the first transaction of such a group; or (b) the transaction may be part of a group sharing a transaction identifier but any preceding transactions in the same group have already been completed at the time that the current transaction is received; or (c) the transaction is indeed part of a group sharing the same transaction identifier but all preceding transactions which are currently pending have the same target as the current transaction; or (d) the transaction is not part of a group sharing the same transaction identifier. Note that the check carried out by the packet tracker cannot necessarily distinguish between the situations (a), (b) and (d). But it does not need to. It just needs to detect whether or not the current transaction has (by virtue of sharing a transaction identifier but having a different target) an ordering dependency on any other currently pending or outstanding transaction.

The step 540 provides an example in which the mapping circuitry 300 and the transaction index memory 310 are configured to detect whether a transaction has a dependency on a previous transaction and to store data (such as the wait index) defining the transaction index of a previous transaction in the transaction index memory only when the transaction is dependent on a previous transaction. In particular, each transaction has an associated transaction identifier and an associated destination identifier; and a transaction is detected to be dependent upon a previous transaction when the previous transaction has the same transaction identifier but a different destination identifier, and a response has not yet been output for the previous transaction.

Referring to the step 540, if there is no other outstanding transaction with the same identifier and a different target, then a so-called bypass state is detected at a step 560. As discussed below, a so-called bypass flag is set by the packet tracker (at a step 530) to indicate to the apparatus, upon return of the transaction response for that transaction, that the response does not need to be buffered but can instead be forwarded directly to the master device which instated that transaction. The bypass flag is not set at the step 560, but instead it takes place slightly later in the process after a credit check relating to the packet tracker has been completed.

The step 560 provides an example of the mapping circuitry 300 being configured to generate a bypass indication in respect of a transaction which is independent of any previous transaction. A step 620 (discussed below) and its "yes" output provide an example of the apparatus being configured to output a response for a transaction having a bypass indication generated by the mapping circuitry.

If there is, however, another pending transaction with the same identifier and a different target, then control passes to a step 500.

If the situation (c) applies, then control passes to a step 500 at which a check is performed by the credit circuitry 260 to detect whether a credit is available. If so, then the transaction is issued at a step 520. If not, then at a step 510, the system waits and retries the issue of the transaction.

The number of credits issued to or initialised by the credit circuitry may be equal to the capacity of the CDAS memory 310 and/or of the response buffer 320 (or the lower of these two). For a request such as a data read having a response which will occupy more than one space in the response buffer, the number of credits can be reduced/increased by the number of response buffer entries when that transaction is issued/the response is returned. When a transaction is issued which does not require (or potentially require) reordering, such as a transaction unrelated to other transactions, with a unique identifier, the bypass flag will be set by the apparatus 210 and the number of credits is not reduced (and, according to the flowchart of FIG. 5, a credit check relating to the space in the response buffer and/or CDAS memory need not even be carried out). This is because that transaction response will not require any space in the CDAS memory 310 or the response buffer 320. However, a separate credit check 502, 504 relating to the number of available entries in the packet tracker 300 can be carried out as discussed above with reference to FIG. 2.

After the step 520, the issue of the transaction, at a step 530, an entry is stored in the packet tracker 300 and, if appropriate (see the step 560 discussed above) the bypass flag is set. The packet tracker 300 records the transaction identifier and destination.

At the step 550, an index is allocated by the packet tracker to that transaction. The index is not (in these examples) explicitly stored at the packet tracker. Instead, it is implied by the location of the entry used or allocated to store other information about the transaction at the packet tracker. The index is stored at other components of the apparatus of FIG. 3 only if it is needed. In the case of a transaction for which the bypass flag is not set, the index can indicate, or more generally be used to determine, an entry in the response buffer 320 at which the transaction response will be buffered when it is returned to the apparatus.

At a step 570, a "wait index" is stored in the CDAS memory 310 at a step 550. The wait index is the index of the transaction which caused the buffer allocation to be required, or in other words which is the next-earlier transaction having the same transaction identifier but a different target. The wait index is therefore the index of the transaction on which the current transaction directly depends. The wait index is stored at a content-addressable location in the CDAS memory (which is a so-called content addressable memory or CAM) corresponding to the index of the current transaction. This is an example of mapping circuitry (such as the packet tracker) being configured to provide the data, defining the transaction index of a previous transaction, to the transaction index memory (the CDAS memory) in response to issue of the given transaction The response buffer 320 has a flag (CDAS_ok) at the location indicated by the index of the current transaction, which is initially cleared at a step 580 to indicate that the contents of that location should be buffered or held until the CDAS_ok flag is set. The notation or polarity used in the present examples for the CDAS_ok flag is that a "clear(ed)" flag (state=0) indicates that a transaction response cannot be output, whereas a "set" flag (state=1) indicates that the transaction response can be output. However, it will be appreciated that other notations or the other polarity could be used.

FIG. 4 schematically illustrates the storage of the wait index and the response location (index) for the current transaction in the CDAS memory 310. In other words, the transaction index memory 310 is configured to store, for the given transaction, a buffer location in the response buffer for buffering a response to the given transaction. The response buffer 320 stores the index and the CDAS_ok flag. Other aspects of FIG. 4 will be discussed below.

As mentioned above, each outstanding transaction which is tracked by the packet tracker 300 is allocated an index value applicable to the period during which the transaction is outstanding. For transactions which have a dependency upon another transaction, the packet tracker 300 stores the wait index (the index of that transaction on which the current transaction depends) at a location defined by the current transaction's index. So, if a transaction B cannot be output as a response before the response for a transaction A then the wait index is the index of the transaction A, which is stored in the CDAS memory at the location corresponding to the index associated with the transaction B.

The CDAS_ok flag is stored by the response buffer 320 and indicate either that the associated entry in the response buffer can be output as soon as it is received or is ready for output, or that it has to be held by the response buffer. At the step 580 of FIG. 5, it is initially cleared to indicate that the buffered response has to be held. Techniques by which it is set (to indicate that the buffered response can be output, or output when received) will be discussed below.

As mentioned above, the CDAS memory 310 provides a content addressable lookup between the wait index and the index defining a location in the response buffer 320.

The purpose of the various indices and flags will become clearer with a discussion of FIG. 6, which schematically illustrates the process followed when a read response is received at the input 240.

At a step 600 in FIG. 6, a read response is received.

At a step 610, the index associated with that read response is detected by the packet tracker from its records. The index is provided to the response buffer 320 as a signal 325.

If, at a step 620, the bypass indication is set, then a bypass control signal 305 (FIG. 3) is provided to the multiplexer 330 which passes the read response at a step 630. In other words, in the case of a response or partial response having no buffering requirements (because it is not dependent upon another transaction) the response is output without buffering.

If, at a step 640, the current response represents the last portion or piece of data in a multiple part response, then control passes to a step 650, but otherwise control returns to the step 600 to process the next read response.

Returning to the step 620, if the bypass indication is not set, then the read response is stored at a step 670 in the response buffer 320. Note that in the present examples this storage in the buffer occurs even if the CDAS_ok flag for that entry in the response buffer is set.

At a step 680, if the CDAS_ok flag is set (indicating that the read response can be directly output) then that read response is output from the response buffer via the multiplexer 330 at a step 690 and control passes to the step 650. If not, the response remains in the read buffer and control returns to the step 600 to handle the next read response.

The steps 670, 680 therefore provide an example of the response buffer 320 and the transaction index memory 310 cooperating to store the indicator (CDAS_ok) to indicate whether, for the given transaction, the response to the previous transaction has been output; and the response buffer 320 being configured to buffer a transaction response received in respect of the given transaction at least until the indicator is indicates that a response to the previous transaction has been output.

At the step 650, the CDAS memory 310 receives the index value stored in the response buffer 320 for a response which is being output and which is then passed to the CDAS memory 310 as a signal 315 from the multiplexer 330. The index received as the signal 315 addresses the entry in the content-addressable CDAS memory which contains that value as its wait index and which points (as described above) to the buffer entry which is itself dependent upon that wait index. So, as the current response having a current index value is being output, the routing of the index value as the signal 315 to the CDAS memory causes the CDAS memory to provide, as an output signal 317, the buffer location in the response buffer of the response which depends on the currently output response. This is achieved in example arrangements by the transaction index memory 310 being addressable by a transaction index of transaction response output by the apparatus to provide the transaction index of a transaction dependent upon the transaction response output by the apparatus.

Therefore, by virtue of the feature that the mapping circuitry (for example the packet tracker) was configured to provide the data (such as a wait index), defining the transaction index of a previous transaction, to the transaction index memory (such as the CDAS memory) in response to issue of the given transaction, this information is available at the steps 650 and 680 without requiring a further lookup.

The index as the signal 317 is used to instruct the response buffer 320 to set the CDAS_ok flag at the location in the response buffer of the next transaction (whether or not that transaction's response has yet been received) which depends on the currently output transaction, so indicating that the next transaction's response can be output as soon as it is available. This corresponds to the step 650 in FIG. 6.

The multiplexer 330 therefore provides an example of output circuitry to output a given transaction response and to initiate (via the signal 315, leading to the provision of the signal 317) the setting of the indicator to indicate, for a transaction dependent upon the given transaction response, that the given transaction response has been output.

At a step 660, the relevant entry in the packet tracker is cleared and made available for a future transaction, and the credit (if applicable) corresponding to the transaction is made available again.

Returning to FIG. 4, the inter-relationship of these data items is schematically illustrated. For an outgoing response, the index value of the outgoing response is provided to the CDAS memory 310 as the signal 315 where it is used to identify (by addressing the CDAS memory via the wait index field) the response location in the response buffer 320 of the next response which depends on the current outgoing response. The CDAS memory 310 provides information 317 to the response buffer 320 to allow the CDAS_ok flag for that next dependent response to be set so that the next response is allowed to be output.

In some examples, transaction responses such as responses to data read requests can be returned as multiple portions or "beats", for example in situations where the bus width of a slave device being accessed is less than the bus width of the master device making the request. For example, a read response may be returned as two or four such portions of beats.

In situations where the read request is independent of other transactions (as discussed above, it either has a unique identifier or it shares an identifier but also shares a target) then the response buffer can be used to reassemble the beats (such as a data beat shown in FIG. 4) into a full response to be output to the requesting master device and to output them in response to the last beat being received. So, the earlier beats (before the final beat) are buffered even if the bypass flag is set for that transaction.

If there is a dependency, then the same mechanism as described above is also used to buffer the complete response until the response to the transaction on which that transaction depends has also been output.

Where a read response consists of multiple data beats of the same bus width as that of the master device, such that there is no need to reassemble them in the response buffer, then they are either buffered (if a dependency of that transaction response has been identified) or output directly (if the bypass flag is set).

Therefore, in these examples, for a transaction response received as multiple successive response portions, the response buffer is configured to buffer the response portions at least until a last of the response portions has been received. In these examples, the response buffer is configured to output the buffered transaction response to the transaction master device which issued that transaction when a last of the response portions has been received and the previously issued transaction has already been output by the apparatus.

Figure 7:
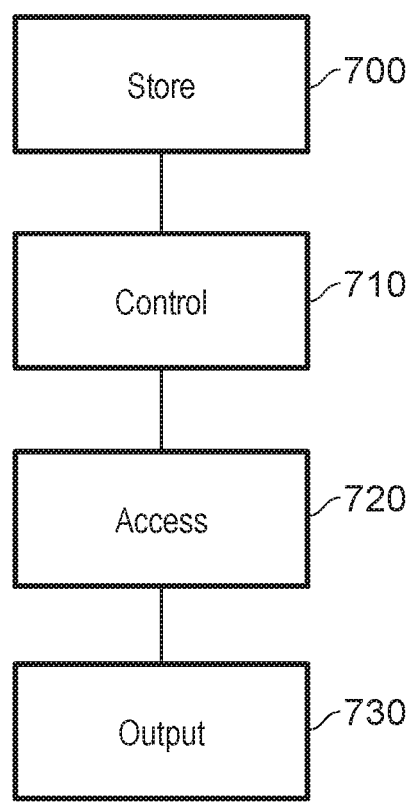

FIG. 7 is a schematic flowchart illustrating a transaction handling method comprising:

storing (at a step 700) data defining each transaction issued by one or more transaction master devices;

controlling (at a step 710) routing of a transaction response to a given transaction either to a response buffer operable to buffer the transaction response or as an output to the transaction master device which issued the given transaction;

accessing (at a step 720) data for each buffered transaction response indicating a previously issued transaction on which that buffered transaction response depends; and outputting (at a step 730) the buffered transaction response to the transaction master device which issued that transaction when the previously issued transaction has already been output by the apparatus.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Transaction handling apparatus comprising:
a response buffer; and
tracking circuitry to store data defining each transaction issued by one or more transaction master devices and to control routing of a transaction response to a given transaction either to the response buffer or as an output to the transaction master device which issued the given transaction;
the response buffer being configured to access an indicator for each buffered transaction response indicating whether a response has been output by the apparatus for a previously issued transaction, on which that buffered transaction response depends, and to output the buffered transaction response to the transaction master device which issued that transaction when the previously issued transaction has already been output by the apparatus;
in which the tracking circuitry comprises:
mapping circuitry to map each transaction to a transaction index; and
a transaction index memory to store, for a given transaction, data defining the transaction index of a previous transaction on which the given transaction is dependent;
the response buffer and the transaction index memory cooperating to store the indicator to indicate whether, for the given transaction, the response to the previous transaction has been output; and
the response buffer being configured to buffer a transaction response received in respect of the given transaction at least until the indicator indicates that a response to the previous transaction has been output.

2. Apparatus according to claim 1, in which the mapping circuitry is configured to provide the data, defining the transaction index of a previous transaction, to the transaction index memory in response to issue of the given transaction.

3. Apparatus according to claim 1, in which:
the mapping circuitry and the transaction index memory are configured to detect whether a transaction has a dependency on a previous transaction and to store data defining the transaction index of a previous transaction in the transaction index memory only when the transaction is dependent on a previous transaction.

4. Apparatus according to claim 3, in which the transaction index memory is configured to store, for the given transaction, a buffer location in the response buffer for buffering a response to the given transaction.

5. Apparatus according to claim 3, comprising:
output circuitry to output a given transaction response and to initiate the setting of the indicator to indicate, for a transaction dependent upon the given transaction response, that the given transaction response has been output.

6. Apparatus according to claim 5, in which the transaction index memory is addressable by a transaction index of transaction response output by the apparatus to provide the transaction index of a transaction dependent upon the transaction response output by the apparatus.

7. Apparatus according to claim 6, in which:
the response buffer is configured to store the indicator to indicate whether, for the given transaction, the response to the previous transaction has been output.

8. Apparatus according to claim 1, in which, for a transaction response received as multiple successive response portions, the response buffer is configured to buffer the response portions at least until a last of the response portions has been received.

9. Apparatus according to claim 8, in which the response buffer is configured to output the buffered transaction response to the transaction master device which issued that transaction when a last of the response portions has been received and the previously issued transaction has already been output by the apparatus.

10. A transaction handling method comprising:
storing data defining each transaction issued by one or more transaction master devices;
controlling routing of a transaction response to a given transaction either to a response buffer operable to buffer the transaction response or as an output to the transaction master device which issued the given transaction;
accessing data for each buffered transaction response indicating a previously issued transaction on which that buffered transaction response depends;
outputting the buffered transaction response to the transaction master device which issued that transaction when the previously issued transaction has already been output by the apparatus;
mapping each transaction to a transaction index;
storing, for a given transaction, data defining the transaction index of a previous transaction on which the given transaction is dependent;
storing the indicator to indicate whether, for the given transaction, the response to the previous transaction has been output; and
buffering a transaction response received in respect of the given transaction at least until the indicator indicates that a response to the previous transaction has been output.

11. Transaction handling apparatus comprising:
means for buffering transaction responses;
means for storing data defining each transaction issued by one or more transaction master means;
means for controlling routing of a transaction response to a given transaction either to a means for buffering or as an output to the transaction master means which issued the given transaction;
means for accessing data for each buffered transaction response indicating whether a response has been output by the apparatus for a previously issued transaction on which that buffered transaction response depends;
means for outputting the buffered transaction response to the transaction master means which issued that transaction when the previously issued transaction has already been output by the apparatus;
means for mapping each transaction to a transaction index;
means for storing, for a given transaction, data defining the transaction index of a previous transaction on which the given transaction is dependent;
means for storing the indicator to indicate whether, for the given transaction, the response to the previous transaction has been output; and
means for buffering a transaction response received in respect of the given transaction at least until the indicator indicates that a response to the previous transaction has been output.

12. Apparatus according to claim 1, in which:
the mapping circuitry is configured to generate a bypass indication in respect of a transaction which is independent of any previous transaction; and
the apparatus is configured to output a response for a transaction having a bypass indication generated by the mapping circuitry.

13. Apparatus according to claim 1, in which:
each transaction has an associated transaction identifier and an associated destination identifier; and
a transaction is detected to be dependent upon a previous transaction when the previous transaction has the same transaction identifier but a different destination identifier, and a response has not yet been output for the previous transaction.

* * * * *